United States Patent
Kim et al.

(10) Patent No.: US 12,441,236 B2
(45) Date of Patent: Oct. 14, 2025

(54) ACTIVE NOTICE DEVICE FOR SAFETY OF VEHICLE AND PEDESTRIAN

(71) Applicant: RESEARCH COOPERATION FOUNDATION OF YEUNGNAM UNIVERSITY, Gyeongsangbuk-do (KR)

(72) Inventors: Gun Zung Kim, Daegu (KR); Soo Jung Hur, Daegu (KR); Jeong Sook Eom, Daegu (KR); Yong Wan Park, Daegu (KR)

(73) Assignee: RESEARCH COOPERATION FOUNDATION OF YEUNGNAM UNIVERSITY, Gyeongsangbuk-Do (KR)

( * ) Notice: Subject to any disclaimer, the term of this patent is extended or adjusted under 35 U.S.C. 154(b) by 0 days.

(21) Appl. No.: 18/109,403

(22) Filed: Feb. 14, 2023

(65) Prior Publication Data

US 2023/0264628 A1 Aug. 24, 2023

(30) Foreign Application Priority Data

Feb. 21, 2022 (KR) .................. 10-2022-0022409

(51) Int. Cl.
*G01S 13/931* (2020.01)
*B60Q 1/50* (2006.01)
(Continued)

(52) U.S. Cl.
CPC ............ *B60Q 1/525* (2013.01); *G01S 13/931* (2013.01); *G01S 15/931* (2013.01); *G01S 17/931* (2020.01); *B60Q 2400/50* (2013.01)

(58) Field of Classification Search
None
See application file for complete search history.

(56) References Cited

U.S. PATENT DOCUMENTS 9,505,402 B2 * 11/2016 Fung ..................... G08G 1/166
9,836,965 B2 * 12/2017 Burke .................. G08G 1/0112
(Continued)

FOREIGN PATENT DOCUMENTS

KR 10-2006-0071908 A 6/2006
KR 10-0759757 B1 9/2007
(Continued)

OTHER PUBLICATIONS

Office action issued on Sep. 27, 2023 from Korean Patent Office in a counterpart Korean Patent Application No. 10-2022-0022409 (all the cited references are listed in this IDS.) (English translation is also submitted herewith.).

*Primary Examiner* — Muhammad Adnan
(74) *Attorney, Agent, or Firm* — The PL Law Group, PLLC

(57) ABSTRACT

An active notice device according to an embodiment includes a signal receiver configured to receive a signal generated by the active sensor of the surrounding vehicle, a signal analyzer configured to analyze characteristics of the signal received by the signal receiver, an information generator configured to generate information recognizable by the surrounding vehicle according to user setting, a signal generator configured to amplify and generate characteristics of the signal analyzed by the signal analyzer using the information generated by the information generator, and a signal transmitter configured to transmit the signal amplified and generated by the signal generator to an active sensor of the surrounding vehicle corresponding thereto.

8 Claims, 3 Drawing Sheets

(51) Int. Cl.
*G01S 15/931* (2020.01)
*G01S 17/931* (2020.01)

(56) References Cited

U.S. PATENT DOCUMENTS

| | | | | |
|---|---|---|---|---|
| 11,639,132 B2* | 5/2023 | Yamoto | ............... | G08G 1/166 |
| | | | | 340/435 |
| 11,670,174 B2* | 6/2023 | Mikuriya | ............... | G08G 1/202 |
| | | | | 340/988 |
| 11,735,051 B2* | 8/2023 | Hughes | ............... | G08G 1/166 |
| | | | | 340/436 |
| 11,794,645 B2* | 10/2023 | Lee | ............... | G08G 1/0175 |
| 11,847,918 B2* | 12/2023 | Wienss | ............... | G08G 1/166 |
| 11,884,311 B2* | 1/2024 | Kurz | ............... | G06V 20/182 |
| 11,935,413 B2* | 3/2024 | Oya | ............... | G06V 20/58 |
| 11,953,590 B1* | 4/2024 | Abdeldayem | ............... | G01S 7/354 |
| 2006/0125680 A1* | 6/2006 | Thackray | ............... | G01S 17/86 |
| | | | | 342/146 |
| 2017/0294117 A1* | 10/2017 | Burke | ............... | H04N 7/181 |
| 2018/0170400 A1* | 6/2018 | Mahnke | ............... | G08G 1/017 |
| 2019/0206255 A1* | 7/2019 | Tao | ............... | H04W 4/46 |
| 2019/0346857 A1* | 11/2019 | Chase | ............... | G06V 40/23 |
| 2020/0118441 A1* | 4/2020 | Han | ............... | G08G 1/161 |
| 2021/0134156 A1* | 5/2021 | Lee | ............... | G08G 1/166 |
| 2021/0385573 A1* | 12/2021 | Popa | ............... | H04R 1/406 |
| 2022/0073035 A1* | 3/2022 | Onoda | ............... | B60S 1/603 |
| 2022/0185308 A1* | 6/2022 | Baek | ............... | B60Q 1/52 |

FOREIGN PATENT DOCUMENTS

| | | | |
|---|---|---|---|
| KR | 101192434 B1 * | 12/2008 | |
| KR | 10-2010-0070163 A | 6/2010 | |
| KR | 10-2016-0112564 A | 9/2016 | |
| KR | 10-2021-0158465 A | 12/2021 | |

* cited by examiner

ACTIVE NOTICE DEVICE FOR SAFETY OF VEHICLE AND PEDESTRIAN

CROSS-REFERENCE TO RELATED APPLICATION AND CLAIM OF PRIORITY

This application claims the benefit under 35 USC § 119 of Korean Patent Application No. 10-2022-0022409 filed on Feb. 21, 2022, in the Korean Intellectual Property Office, the entire disclosure of which is incorporated herein by reference for all purposes.

BACKGROUND

1. Field

Embodiments of the present disclosure relate to an active notice device for safety of a vehicle and a pedestrian that enables a surrounding vehicle to accurately recognize a situation of an obstacle and a pedestrian at a long distance as well as at a short distance and to effectively prevent an accident of the vehicle and achieve safety of the pedestrian in response thereto.

2. Description of Related Art

Generally, pedestrians are very fragile compared to the vehicle such as a heavy and strong car, and thus, in the event of an accident, pedestrians are fatally injured, and in many cases, even in the accident in which the vehicle collides with an obstacle, etc., passengers in the vehicle are injured.

These days, a variety of personal mobility devices such as a bicycle, a motorcycle, an electric wheel, etc. are being operated, and the possibility of various accidents is increasing due to their fast operation.

In particular, when there is a blind spot due to an intersection, road corner, front and rear vehicle, etc., even if the vehicle moves slowly, it takes about 5 seconds for a driver to recognize the pedestrian and stop safely. If the time is shorter than 5 seconds, the possibility of leading to an accident is very high.

Accordingly, as the vehicle technology develops, various systems for preventing safety accidents of the vehicle are being developed. In particular, the latest automobile or autonomous car equipped with advanced driver assistance system (ADAS) uses a plurality of cognitive sensors such as a camera, an ultrasonic sensor, a radar sensor, a LiDAR sensor, etc. to detect the surrounding environment while driving, checks whether there is an obstacle, and then informs the driver or prevents safety accidents through self-control of the car.

Here, the cognitive sensors constituting the advanced driver assistance system can be divided into passive sensors such as a camera and active sensors such as ultrasound, radar, and LiDAR sensors. While driving, the vehicle equipped with the advanced driver assistance system continuously performs sensing and recognizing tasks for the surrounding environment through the active sensor and passive sensor to determine and cope with stopping, accelerating, decelerating, or changing the route of the vehicle to avoid the collision with the pedestrian and obstacle around the vehicle, thereby enabling avoidance driving.

In this case, information acquired by GPS and precise maps, such as navigation only statically indicates only a route on which the vehicle can drive, and objects on the route during current driving are not only difficult to display, but also change from moment to moment. Therefore, in order to know in real time which objects, such as the pedestrian and obstacle, are present, there is no choice but to rely on information acquired by the cognitive sensors of the advanced driver assistance system devices described above.

However, the conventional cognitive sensors of the advanced driver assistance system have a problem in that the time required to recognize the obstacle such as the pedestrian and safely stop is shortened as recognizability or identifiability is deteriorated due to its own limitations, such as sensing inaccuracy or malfunction, and the influence of weather and the environment, which is highly likely to lead to an accident.

In particular, when smooth visibility is not secured at night or due to rain, snow, or fog, there was a problem in that the passive sensors hardly recognize or identify the pedestrian or the obstacle and the active sensors also rapidly lose sensing ability, which results in reduced recognizability or identifiability, due to weakening of the strength of a signal such as a frequency for recognizing and identifying the pedestrian or the obstacle, or transmission/reception failures, etc., which is highly likely to lead to an accident.

SUMMARY

An embodiment of the present disclosure is to provide an active notice device for safety of a vehicle and a pedestrian capable of preventing safety accidents in advance by conveniently providing information on various types of pedestrians and/or obstacles to a cognitive sensor of a vehicle depending on the installation location, use, and environment.

In addition, an embodiment of the present disclosure is to provide an active notice device for safety of a vehicle and a pedestrian that capable of effectively preventing safety accidents by accurately providing information on the pedestrians and/or obstacles with high recognizability and identifiability to the cognitive sensor of the vehicle even under adverse conditions while driving the vehicle.

According to an embodiment of the present disclosure, there is provided an active notice device for safety of a vehicle and a pedestrian that is provided outside a vehicle and is configured to receive a signal generated from an active sensor of a surrounding vehicle, analyze the received signal, and amplify and generate the analyzed signal, and transmits the amplified signal to the active sensor of the surrounding vehicle, the active notice device including a signal receiver configured to receive a signal generated by the active sensor of the surrounding vehicle, a signal analyzer configured to analyze characteristics of the signal received by the signal receiver, an information generator configured to generate information recognizable by the surrounding vehicle according to user setting, a signal generator configured to amplify and generate characteristics of the signal analyzed by the signal analyzer using the information generated by the information generator, and a signal transmitter configured to transmit the signal amplified and generated by the signal generator to an active sensor of the surrounding vehicle corresponding thereto.

In the active notice device, the signal receiver may include at least one of a radar receiver configured to receive a signal generated by a radar sensor of the surrounding vehicle, a LiDAR receiver configured to receive a signal generated by a LiDAR sensor of the surrounding vehicle, and an ultrasound receiver configured to receive a signal generated by an ultrasonic sensor of the surrounding vehicle.

The signal analyzer may include at least one of a radar analyzer configured to analyze the radar signal received by the signal receiver, a LiDAR analyzer configured to analyze the LiDAR signal received by the signal receiver, and an ultrasound analyzer configured to analyze the ultrasound signal received by the signal receiver.

In this case, information generated by the information generator may include at least one of information recognizable by the radar sensor of the surrounding vehicle, information recognizable by the LiDAR sensor of the surrounding vehicle, and information recognizable by the ultrasonic sensor of the surrounding vehicle.

The signal generator may include a radar generator configured to amplify and generate characteristics of the radar signal analyzed by the signal analyzer, a LiDAR generator configured to amplify and generate characteristics of the LiDAR signal analyzed by the signal analyzer, and an ultrasound generator configured to amplify and generate characteristics of the ultrasound signal analyzed by the signal analyzer.

In addition, the signal transmitter may include a radar transmitter configured to transmit the radar signal amplified and generated by the signal generator, a LiDAR transmitter configured to transmit the LiDAR signal amplified and generated by the signal generator, and an ultrasound transmitter configured to transmit the ultrasound signal amplified and generated by the signal generator.

Meanwhile, the active notice device of this embodiment may be configured to further include a passive signal generator configured to generate a signal recognizable by a passive sensor of the surrounding vehicle using the information generated by the information generator.

In this case, the passive signal generator may include at least one of a thermal image generator configured to generate a thermal image signal implemented by a thermal image camera of the surrounding vehicle, and a hologram generator configured to generate a hologram signal implemented by a camera of the surrounding vehicle.

Meanwhile, the active notice device of this embodiment may be installed in a place where the vehicle is operated and/or carried by a pedestrian.

In this case, the place may correspond to at least one of a child protection zone, a crosswalk without a traffic light, and a blind spot when the vehicle is driving.

DETAILED DESCRIPTION

Hereinafter, a specific embodiment of the present disclosure will be described with reference to the drawings. The following detailed description is provided to aid in a comprehensive understanding of the methods, devices and/or systems described herein. However, this is illustrative only, and the present disclosure is not limited thereto.

In describing the embodiments of the present disclosure, when it is determined that a detailed description of related known technologies may unnecessarily obscure the subject matter of the present disclosure, a detailed description thereof will be omitted. In addition, terms to be described later are terms defined in consideration of functions in the present disclosure, which may vary according to the intention or custom of users or operators. Therefore, the definition should be made based on the contents throughout this specification. The terms used in the detailed description are only for describing the embodiments, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, some or combinations thereof, other than those described.

Figure 1:
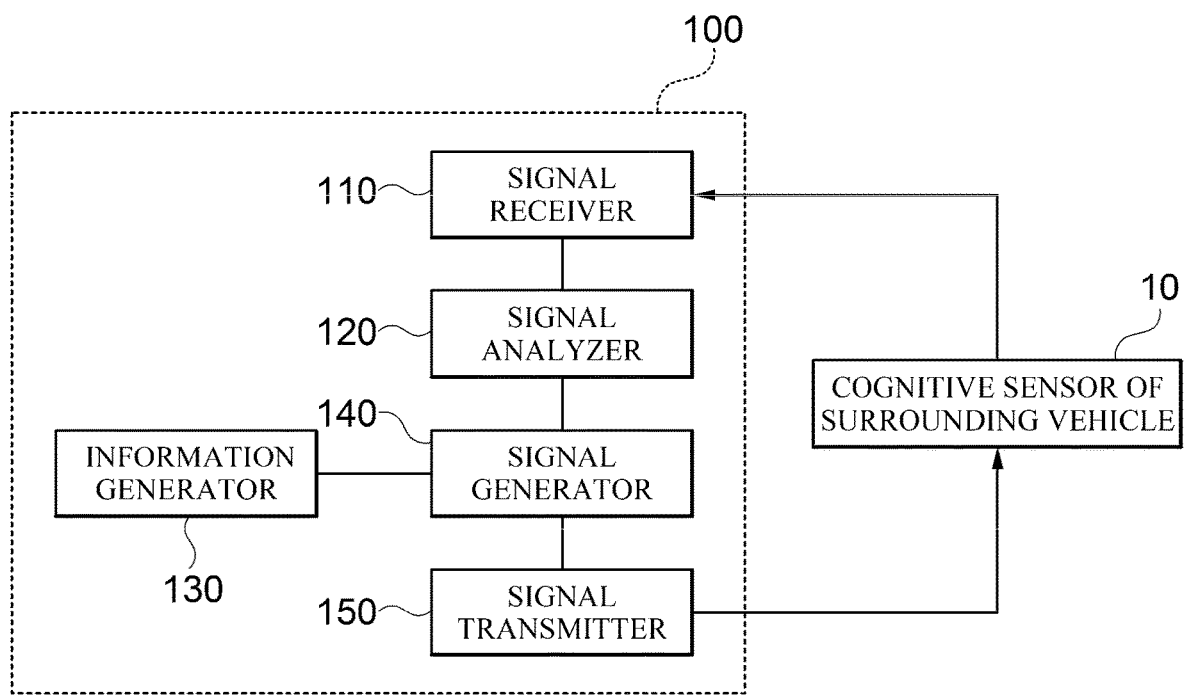
FIG. 1 is a configuration diagram schematically illustrating an application example of an active notice device for a safety of a vehicle and a pedestrian according to an embodiment of the present disclosure.
Figure 2:
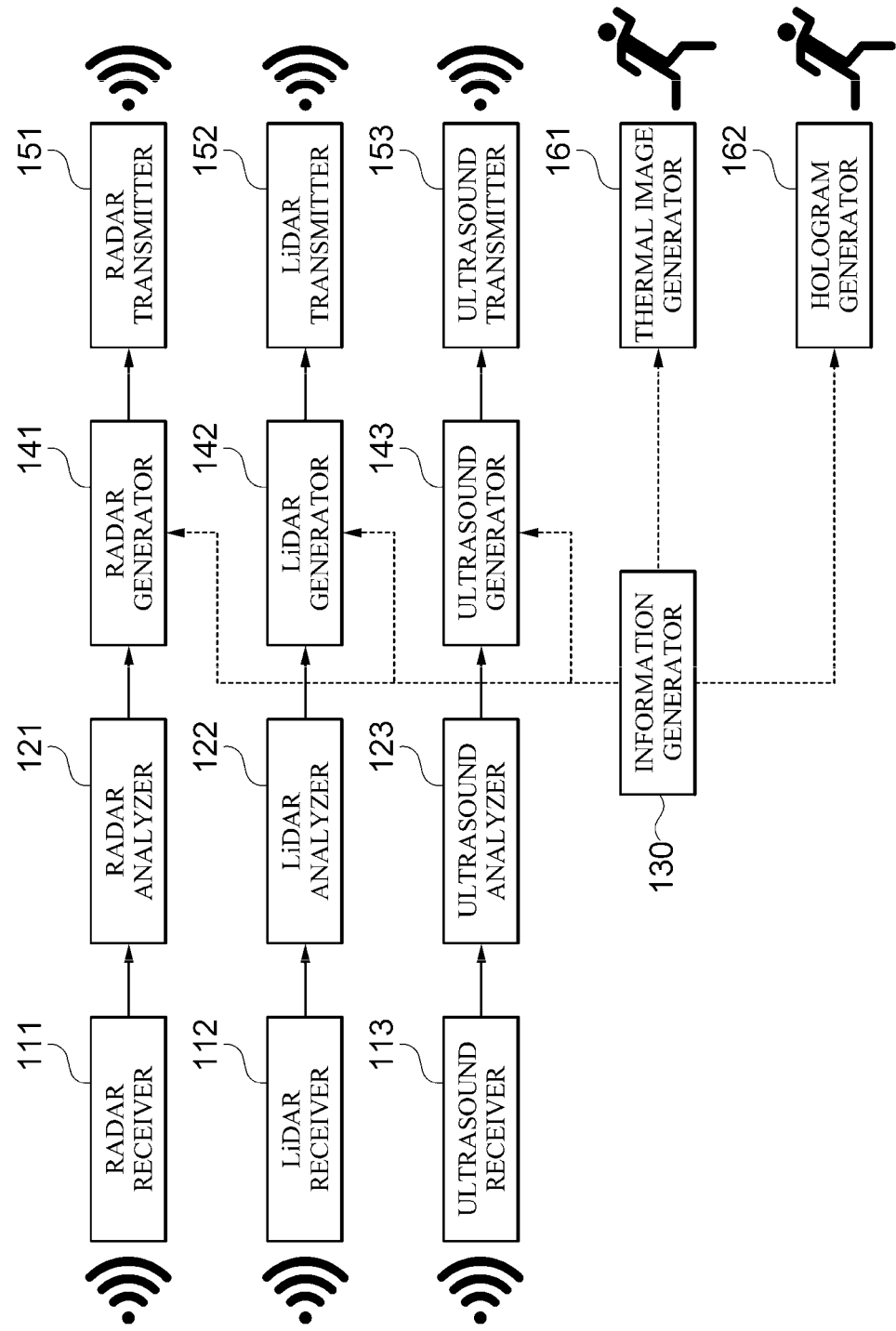
FIG. 2 is a configuration diagram schematically illustrating a detailed configuration example of the active notice device of FIG. 1.
Figure 3:
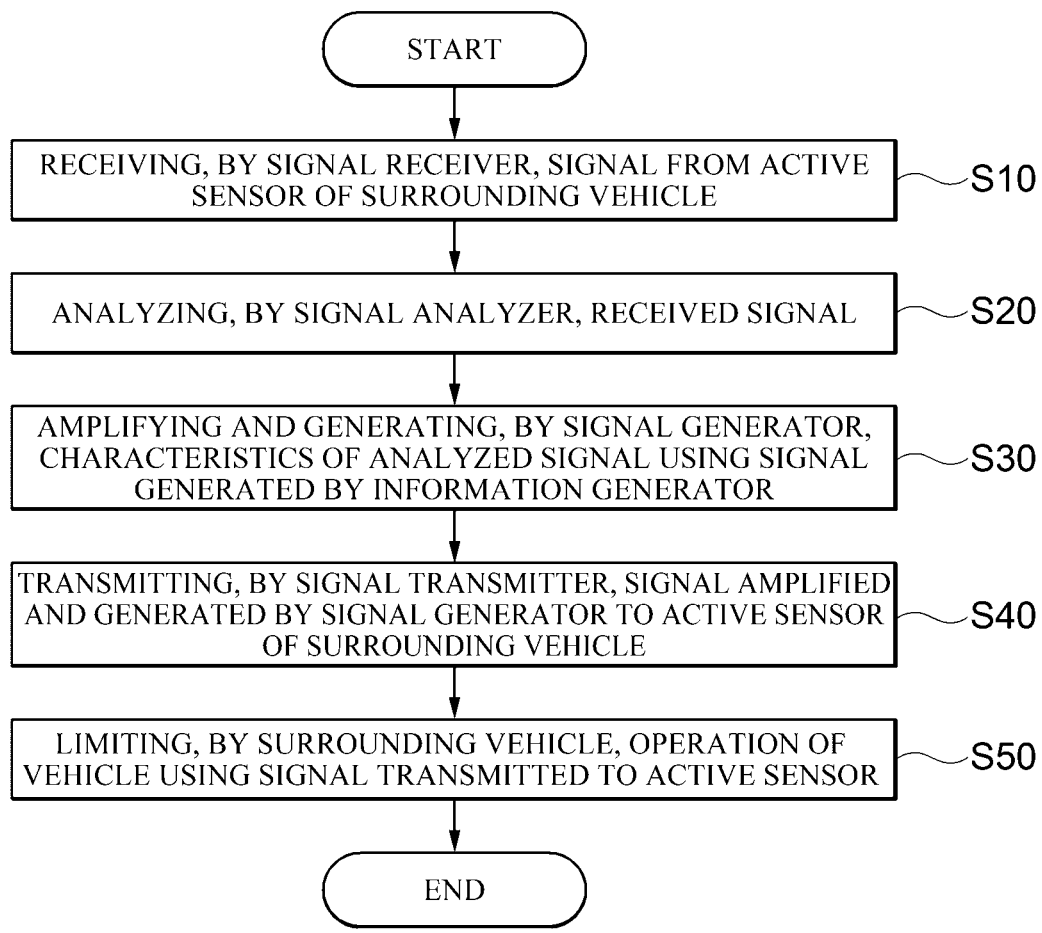
FIG. 3 is a flowchart schematically illustrating an operation process of the active notice device for the safety of the vehicle and the pedestrian according to an embodiment of the present disclosure.

FIG. 1 is a configuration diagram schematically illustrating an application example of an active notice device for a safety of a vehicle and a pedestrian according to an embodiment of the present disclosure, FIG. 2 is a configuration diagram schematically illustrating a detailed configuration example of the active notice device of FIG. 1, and FIG. 3 is a flowchart schematically illustrating an operation process of the active notice device for the safety of the vehicle and the pedestrian according to an embodiment of the present disclosure.

Referring to FIG. 1, an active notice device 100 for safety of a vehicle and a pedestrian according to an embodiment of the present disclosure is a device that is provided outside the vehicle, and receives a signal generated a signal generated from a cognitive sensor 10 of a surrounding vehicle, analyzes the received signal, amplifies and generates the analyzed signal, and transmits the amplified signal to the cognitive sensor 10 of the surrounding vehicle. The active notice device 100 may largely include a signal receiver 100 that receives a signal generated by the cognitive sensor 10 of the surrounding vehicle, a signal analyzer 120 that analyzes characteristics of the signal received by the signal receiver 110, an information generator 130 that generates information recognizable by the surrounding vehicle according to user setting, a signal generator 140 that amplifies and generates characteristics of the signal analyzed by the signal analyzer 120 using the information generated by the information generator 130, and a signal transmitter 150 that transmits the signal amplified and generated by the signal generator 140 to the cognitive sensor 10 of the surrounding vehicle corresponding thereto.

Here, the cognitive sensor 10 of the surrounding vehicle may be largely divided into an active sensor and a passive sensor.

More specifically, the active sensor may receive a reflected wave of a frequency of a frequency band determined for each sensor after a signal of the predetermined frequency band is transmitted and convert a time difference, signal strength, and frequency change between signal transmission and signal reception into information about the surroundings, i.e., shape information, medium information, distance information, moving speed, and use the same.

In this case, examples of the active sensor may include a radar sensor, a LiDAR sensor, an ultrasonic sensor, etc. The radar sensor can recognize a wide range of nearby places or only a specific location in a very far place by using a mixture of techniques such as various radio frequencies, modulation methods, and beam forming. That is, the radar sensor may generate and transmit a radio frequency according to characteristics thereof, and then receive a reflected wave to determine the distance to an obstacle, the moving speed, the type thereof, etc. The LiDAR sensor is mainly used for recognizing a specific location at a distance using a laser in a frequency band of invisible light, and is also capable of recognizing a wide range of locations by including a function of adjusting a location to be recognized. That is, the LiDAR sensor may also generate and transmit laser according to characteristics, and then receive the reflected wave to determine the distance to an obstacle, the moving speed, the type thereof, etc. In addition, the ultrasonic sensor is a sensor mainly for widely recognizing a near area, and may generate a signal in the ultrasound frequency band, transmit the signal widely to the surroundings, and receive the reflected wave to determine the distance to an obstacle, the moving speed, the type thereof, etc.

The passive sensor may convert a signal received from the outside into information without transmitting the signal, and use it. For example, the passive sensor may include a camera and a thermal imaging camera, and may mainly perform detection and recognition of various objects around the vehicle. In this case, the camera may receive a frequency of visible light band and convert it into an image, and the thermal imaging camera may receive a frequency of infrared band and convert it into an image.

Meanwhile, in order to prevent failure or malfunction of one of the cognitive sensors including the active sensor and the passive sensor, it can be determined that there is an actual obstacle only when information received from two or more different types of cognitive sensors is compared and the respective cognitive sensors determine that it is the same obstacle. That is, when obstacle information recognized by the combined sensors obtained by combining the active sensor and the passive sensor or by combining two active sensors among the active sensors coincides with each other, it can be determined that it is an obstacle. When the obstacle information recognized by two or more combined cognitive sensors does not coincide with each other, there are various methods, such as acquiring obstacle information again according to a determination algorithm applied to the corresponding vehicle and performing a new recognition process, determining that it is not an obstacle, or determining that it is an obstacle. However, when the obstacle information recognized by two or more combined cognitive sensors coincides with each other, it is preferable to always determine the obstacle as an obstacle and control the vehicle to change the operation of the vehicle in order to avoid the obstacle accordingly.

On the other hand, further referring to FIG. 2, the signal receiver 110 of the active notice device 100 according to this embodiment may include at least one of a radar receiver 111 that receives a signal generated and transmitted by a radar sensor among the active sensors of the surrounding vehicle, a LiDAR receiver 112 that receives a signal generated and transmitted by a LiDAR sensor among the active sensors of the surrounding vehicle, and an ultrasound receiver 113 that receives a signal generated and transmitted by an ultrasonic sensor among the active sensors of the surrounding vehicle.

The signal analyzer 120 may include at least one of a radar analyzer 121 that analyzes the radar signal received by the radar receiver 111 of the signal receiver 110, a LiDAR analyzer 122 that analyzes the LiDAR signal received by the LiDAR receiver 112 of the signal receiver 110, and an ultrasound analyzer 123 that analyzes the ultrasound signal received by the ultrasound receiver 113 of the signal receiver 110.

In addition, the information generated by the information generator 130 may include at least one of information recognizable by the radar sensor among the cognitive sensors 10 of the surrounding vehicle, information recognizable by the LiDAR sensor among the cognitive sensors 10 of the surrounding vehicle, and information recognizable by the ultrasonic sensor among the cognitive sensors 10 of the surrounding vehicle.

The signal generator 140 may include a radar generator 141 that amplifies and generates characteristics of the radar signal analyzed by the radar analyzer 121 of the signal analyzer 120, a LiDAR generator 142 that amplifies and generates characteristics of the LiDAR signal analyzed by the LiDAR analyzer 122 of the signal analyzer 120, and an ultrasound generator 143 that amplifies and generates characteristics of the ultrasound signal analyzed by the ultrasound analyzer 123.

In addition, the signal transmitter 150 may include a radar transmitter 151 that transmits the radar signal amplified and generated by the radar generator 141 of the signal generator 140 to the radar sensor among the cognitive sensors 10 of the surrounding vehicle, a LiDAR transmitter 152 that transmits the LiDAR signal amplified and generated by the LiDAR generator 142 of the signal generator 140 to a LiDAR sensor among the cognitive sensors 10 of the surrounding vehicle, and an ultrasound transmitter 153 that transmits the ultrasound signal amplified and generated by the ultrasound generator 143 of the signal generator 140 to an ultrasonic sensor among the cognitive sensors 10 of the surrounding vehicle.

Meanwhile, the active notice device 100 of this embodiment may be configured to further include passive signal generators 161 and 162 that generate a signal recognizable by the passive sensor among the cognitive sensors 10 of the surrounding vehicle using the information generated by the information generator 130.

Here, the passive signal generators 161 and 162 may include at least one of the thermal image generator 161 that generates a thermal image signal that can be implemented in a thermal image camera corresponding to the passive sensor among the cognitive sensors 10 of the surrounding vehicle, and the hologram generator 162 that generates a hologram signal that can be implemented in a camera corresponding to the passive sensor among the cognitive sensors 10 of the surrounding vehicle.

That is, the thermal image generator 161 may generate a thermal image signal and transmit it to the thermal image camera of the surrounding vehicle, and the hologram generator 162 may generate a hologram signal and transmit it to the camera of the surrounding vehicle.

In this case, the thermal image generator 161 and the hologram generator 162 may respectively generate the thermal image signal and the hologram signal by using thermal image-related information and hologram-related information generated by the information generator 130 according to user setting.

Meanwhile, the active notice device 100 of this embodiment may be installed in a place where the vehicle is operated, for example, at least one place with a high risk of accidents, such as a child protection zone, a crosswalk without a traffic light, a blind spot when the vehicle is driving.

For example, the active notice device 100 of this embodiment may induce safe driving of the vehicle by transmitting an amplified and generated signal that can be recognized in the form in which several people are moving to the cognitive sensor of a corresponding surrounding vehicle in the child protection zone or the crosswalk crossing without a traffic light.

The active notice device 100 of this embodiment can prevent a vehicle collision in advance at a road construction site by transmitting an amplified and generated signal that can be recognized in the form in which a vehicle or building is present to the cognitive sensor of a surrounding vehicle at a site such as the road construction site.

In this case, safety accidents can be prevented by generating information corresponding to a slow-moving obstacle, such as a vehicle clearing the road and transmitting it to the cognitive sensor of the vehicle at a distance.

In addition, even in a bad weather environment where driving visibility is not secured due to fog, rain or snow, through the active notification device 100 of this embodiment, a signal may be transmitted by amplifying the intensity or strength of a signal such as a frequency, or a signal generated by amplifying the size of the pedestrian or an obstacle may be transmitted, so that the cognitive sensor of the vehicle at a distance can accurately recognize it.

Of course, the active notice device 100 of this embodiment can be carried by the pedestrian, and accordingly, the pedestrian can transmit an amplified and generated signal with high recognizability and identifiability to the vehicle around the walking place through the active notice device 100 to prevent safety accidents such as the collision with the vehicle in advance.

Next, with reference to FIG. 3, an operation process of the active notification device 100 for the safety of the vehicle and the pedestrian according to an embodiment of the present disclosure will be described in detail.

First, the signal receiver 110 receives a signal generated and transmitted by the cognitive sensor 10 of the surrounding vehicle, that is, the active sensor (S10).

In this case, the signal generated and transmitted by the radar sensor among the active sensors may be received by the radar receiver 111 of the signal receiver 110, the signal generated and transmitted by the LiDAR sensor among the active sensors may be received by the LiDAR receiver 112 of the signal receiver 110, and the signal generated and transmitted by the ultrasonic sensor among the active sensors may be received by the ultrasound receiver 113 of the signal receiver 110.

Then, the signal analyzer 120 analyzes the signal received by the signal receiver 110 (S20).

In this case, the signal received by the radar receiver 111 may be analyzed by the radar analyzer 121, the signal received by the LiDAR receiver 112 may be analyzed by the LiDAR analyzer 122, and the signal received by the ultrasound receiver 113 may be analyzed by the ultrasound analyzer 123.

Then, the signal generator 140 amplifies and generates the signal analyzed by the signal analyzer 120 recognizable by the cognitive sensor of the corresponding surrounding vehicle according to its characteristics (S30).

In this case, when amplifying and generating the signal, the signal generator 140 may amplify and generate the signal according to its signal characteristics analyzed by the signal analyzer 120 using the information generated according to the user setting by the information generator 130.

In detail, the signal analyzed by the radar analyzer 121 may be amplified and generated according to its characteristics by the radar generator 141, the signal analyzed by the LiDAR analyzer 122 may be amplified and generated according to its characteristics by the LiDAR generator 142, and the signal analyzed by the ultrasound analyzer 123 may be amplified and generated by the ultrasound generator 143 according to its characteristics.

In this case, the information generator 130 may provide, as an example, information, such as the transmission RF frequency, period of regular change of the RF frequency, change in RF frequency caused by the Doppler effect due to the moving speed of the obstacle, delay speed according to the distance between obstacle and vehicle, signal strength according to the reflection characteristics of the obstacle, and the number of reflected waves according to the size of obstacle, to the radar generator 141. Accordingly, the radar generator 141 may generate an amplified signal recognizable by the radar sensor of the corresponding vehicle at a short distance or a long distance using the information.

In addition, the information generator 130 may provide, as an example information, such as the transmission laser wavelength, period of regular change of the laser wavelength, change in laser wavelength caused by the Doppler effect due to the moving speed of the obstacle, delay speed according to the distance between obstacle and vehicle, signal strength according to the reflection characteristics of the obstacle. and the number of reflected waves according to the size of obstacle, to the LiDAR generator 142. Accordingly, the LiDAR generator 142 may generate an amplified signal recognizable by the LiDAR sensor of the corresponding vehicle at a short distance or a long distance using the information.

In addition, the information generator 130 may provide, as an example, information, such as the transmission ultrasound frequency, period of regular change of the ultrasound frequency, change in ultrasound frequency caused by the Doppler effect due to the moving speed of the obstacle, delay speed according to the distance between obstacle and vehicle, signal strength according to the reflection characteristics of the obstacle, and the number of reflected waves according to the size of obstacle, to the ultrasound generator 143. Accordingly, the ultrasound generator 143 may generate an amplified signal recognizable by the ultrasonic sensor of the corresponding vehicle at a short distance or a long distance using the information.

Meanwhile, the information generator 130 may provide, as another example, information, such as the height and width of the thermal image according to the size of obstacle, and the moving speed of the thermal image according to the movement of the obstacle, to the thermal image generator 161. Accordingly, the thermal image generator 161 may generate a thermal image signal recognizable by the thermal image camera of the corresponding vehicle at a short distance or a long distance using the information and transmit the thermal image signal to the thermal image camera.

In addition, the information generator 130 may provide, as another example, information, such as the height and width of the hologram image according to the size of obstacle, and the moving speed of the hologram image according to the movement of the obstacle, to the hologram generator 162. Accordingly, the hologram generator 162 may generate a hologram signal recognizable by the camera of the corresponding vehicle at a short distance or a long distance using the information and transmit it to the camera.

Next, the signal transmitter 150 transmits the amplified signal generated by the signal generator 140 to the cognitive sensor of the corresponding vehicle at a short distance or a long distance, that is, the active sensor, according to its signal characteristics (S40).

In this case, the signal amplified and generated by the radar generator 141 may be transmitted from the radar transmitter 151 to the radar sensor of the corresponding vehicle, the signal amplified and generated by the LiDAR generator 142 may be transmitted from the LiDAR transmitter 152 to the LiDAR sensor of the corresponding vehicle, and the signal amplified and generated by the ultrasound generator 143 may be transmitted from the ultrasound transmitter 153 to the ultrasonic sensor of the corresponding vehicle.

Accordingly, vehicles that receive the amplified and generated signal from the signal transmitter 150 of the active notice device 100 of this embodiment through the active sensors can prevent the risk of safety accidents in advance by limiting the operation of the vehicle, such as operating a brake system, using the signal (S50).

In addition, vehicles that receive the thermal image signal and the hologram signal generated from the passive signal generators 161 and 162 of the active notice device 100 of this embodiment through the passive sensors can also effectively prevent safety accidents by limiting the operation of the vehicle, such as operating the brake system, using the signals.

Of course, the vehicle that simultaneously received the signals obtained by combining the signal amplified and generated by the signal transmitter 150 and the signal generated from the passive signal generators 161 and 162 of the active notice device 100 of this embodiment can limit the operation of the vehicle more efficiently by using the combined signals.

According to the embodiment of the present disclosure, there is an advantage in preventing safety accidents in advance by conveniently providing information on various types of pedestrians and/or obstacles to a cognitive sensor of a vehicle depending on the installation location, such as a child protection zone, a crosswalk without a traffic light, and a blind spot of the vehicle, use, and environment.

In addition, the embodiment of the present disclosure has an advantage of effectively preventing safety accidents by accurately providing information on pedestrians and/or obstacles with high recognition and identification to the cognitive sensor of the vehicle even under adverse conditions while driving the vehicle, such as nighttime or when smooth visibility is not secured due to rain, snow, fog, etc.

Although representative embodiments of the present disclosure have been described in detail, a person skilled in the art to which the present disclosure pertains will understand that various modifications may be made thereto within the limits that do not depart from the scope of the present disclosure. Therefore, the scope of rights of the present disclosure should not be limited to the described embodiments, but should be defined not only by claims set forth below but also by equivalents to the claims.

What is claimed is:

1. An active notice device for safety of a vehicle and a pedestrian, the active notice device provided outside the vehicle and configured to receive a signal generated from an active sensor of a surrounding vehicle, analyze the received signal, and amplify and generate the analyzed signal, and transmit the amplified signal to the active sensor of the surrounding vehicle, the active notice device comprising:
   a signal receiver configured to receive a signal generated by the active sensor of the surrounding vehicle;
   a signal analyzer configured to analyze characteristics of the signal received by the signal receiver;
   an information generator configured to generate information recognizable by the surrounding vehicle according to user setting;
   a signal generator configured to amplify and generate characteristics of the signal analyzed by the signal analyzer using the information generated by the information generator;
   a signal transmitter configured to transmit the signal amplified and generated by the signal generator to the active sensor of the surrounding vehicle corresponding thereto; and
   a passive signal generator configured to generate a signal recognizable by a passive sensor of the surrounding vehicle using the information generated by the information generator,
   wherein the passive signal generator includes:
   at least one of a thermal image generator configured to generate a thermal image signal detected by a thermal image camera of the surrounding vehicle, and a hologram generator configured to generate a hologram signal detected by a camera of the surrounding vehicle.

2. The active notice device of claim 1, wherein the signal receiver includes:
   at least one of a radar receiver configured to receive a signal generated by a radar sensor of the surrounding vehicle, a light detection and ranging (LiDAR) receiver configured to receive a signal generated by a LiDAR sensor of the surrounding vehicle, and an ultrasound receiver configured to receive a signal generated by an ultrasonic sensor of the surrounding vehicle.

3. The active notice device of claim 1, wherein the signal analyzer includes:
   at least one of a radar analyzer configured to analyze the radar signal received by the signal receiver, a light detection and ranging (LiDAR) analyzer configured to analyze the LiDAR signal received by the signal receiver, and an ultrasound analyzer configured to analyze the ultrasound signal received by the signal receiver.

4. The active notice device of claim 1, wherein information generated by the information generator includes:
   at least one of information recognizable by the radar sensor of the surrounding vehicle, information recognizable by a light detection and ranging (LiDAR) sensor of the surrounding vehicle, and information recognizable by the ultrasonic sensor of the surrounding vehicle.

5. The active notice device of claim 1, wherein the signal generator includes:
   a radar generator configured to amplify and generate characteristics of the radar signal analyzed by the signal analyzer, a light detection and ranging (LiDAR) generator configured to amplify and generate characteristics of the LiDAR signal analyzed by the signal analyzer, and an ultrasound generator configured to amplify and generate characteristics of the ultrasound signal analyzed by the signal analyzer.

6. The active notice device of claim 1, wherein the signal transmitter includes:
   a radar transmitter configured to transmit the radar signal amplified and generated by the signal generator, a light detection and ranging (LiDAR) transmitter configured to transmit the LiDAR signal amplified and generated by the signal generator, and an ultrasound transmitter configured to transmit the ultrasound signal amplified and generated by the signal generator.

7. The active notice device of claim 1, wherein the active notice device is installed in a place where the vehicle is operated and/or carried by a pedestrian.

8. The active notice device of claim 7, wherein the place corresponds to at least one of a child protection zone, a crosswalk without a traffic light, and a blind spot when the vehicle is driving.

* * * * *